US010141012B1

(12) United States Patent
Lavoie

(10) Patent No.: US 10,141,012 B1
(45) Date of Patent: Nov. 27, 2018

(54) MANUAL TO AUTOMATIC TURNTABLE PLAYER CONVERSION

(71) Applicant: Thomas G. Lavoie, Renfrew, PA (US)

(72) Inventor: Thomas G. Lavoie, Renfrew, PA (US)

( * ) Notice: Subject to any disclaimer, the term of this patent is extended or adjusted under 35 U.S.C. 154(b) by 0 days.

(21) Appl. No.: 15/700,863

(22) Filed: Sep. 11, 2017

Related U.S. Application Data

(60) Provisional application No. 62/470,843, filed on Mar. 13, 2017.

(51) Int. Cl.
| | |
|---|---|
| *G11B 3/085* | (2006.01) |
| *G11B 3/06* | (2006.01) |
| G11B 3/095 | (2006.01) |
| G11B 3/08 | (2006.01) |
| G11B 3/09 | (2006.01) |

(52) U.S. Cl.
CPC ............ *G11B 3/08512* (2013.01); *G11B 3/06* (2013.01); *G11B 3/08* (2013.01); *G11B 3/085* (2013.01); *G11B 3/08525* (2013.01); *G11B 3/09* (2013.01); *G11B 3/0957* (2013.01)

(58) Field of Classification Search
None
See application file for complete search history.

(56) References Cited

U.S. PATENT DOCUMENTS

| | | | |
|---|---|---|---|
| 3,727,922 A | 4/1973 | Igata | |
| 3,937,903 A | 2/1976 | Osann, Jr. | |
| 4,093,832 A * | 6/1978 | Isaacson | G11B 3/02 250/214 B |
| 4,106,775 A * | 8/1978 | Takizawa | G11B 3/095 369/203 |
| 4,114,893 A | 9/1978 | Leach et al. | |

(Continued)

FOREIGN PATENT DOCUMENTS

| | | |
|---|---|---|
| DE | 2839801 A1 | 6/1983 |
| JP | 58102303 A | 12/1983 |

(Continued)

OTHER PUBLICATIONS

Most Common and Most Budgeted Arduino Light Sensors, Intorobotics, Jan. 26, 2015, https://www.intorobotics.com/common-budgeted-arduino-light-sensors/.

(Continued)

*Primary Examiner* — Tan X Dinh
(74) *Attorney, Agent, or Firm* — William F. Lang, IV; Lang Patent Law LLC

(57) ABSTRACT

A manual to automatic record player conversion includes a base unit and a blade that attaches to the tone arm. The base unit includes a movable a piston that engages the blade in order to move the tone arm upward, to specified locations on the record, or to the rest position. The position of the blade is detected by locating a reflective strip on the blade using an optical sensor, so that the piston remains positioned under the blade. The piston uses a tapered cone structure to engage a slot in the blade, compensating for any inaccuracies in position of the piston with respect to the blade. The base unit may be structured to interact with a remote control through Bluetooth or other wireless connectivity. The remote control may be a software program or "app" that is operated through a smart phone, tablet computer, or other computer.

25 Claims, 15 Drawing Sheets

(56) References Cited

U.S. PATENT DOCUMENTS

| | | | | |
|---|---|---|---|---|
| 4,134,593 | A * | 1/1979 | Hiramatsu | G11B 3/08512 369/216 |
| 4,148,492 | A * | 4/1979 | Bachelet | G11B 3/085 369/226 |
| 4,166,621 | A * | 9/1979 | Isaacson | G11B 3/02 369/206 |
| 4,196,907 | A * | 4/1980 | Takizawa | G11B 17/05 369/200 |
| 4,226,425 | A | 10/1980 | Leach et al. | |
| 4,230,323 | A * | 10/1980 | Tsuji | G11B 3/08512 369/221 |
| 4,262,912 | A * | 4/1981 | Nakai | G11B 3/08574 369/216 |
| 4,301,526 | A | 11/1981 | Morii et al. | |
| 4,398,278 | A | 8/1983 | Suzuki | |
| 4,437,180 | A | 3/1984 | Takeuchi | |
| 4,460,991 | A * | 7/1984 | Omoto | G11B 3/08567 369/221 |
| 4,528,653 | A * | 7/1985 | Asano | G11B 3/0952 369/266 |
| 4,694,449 | A | 9/1987 | Einhaus | |

FOREIGN PATENT DOCUMENTS

| | | |
|---|---|---|
| JP | 58212601 | 12/1983 |
| JP | 58215701 A | 12/1983 |
| JP | S58212602 | 12/1983 |
| JP | 60131602 A | 7/1985 |
| JP | 62257601 A | 11/1987 |

OTHER PUBLICATIONS

Amy Unger, Parts of a Record Player, The Klipsch Joint, Jun. 27, 2016, http://www.klipsch.com/blog/parts-of-a-record-player.

* cited by examiner

MANUAL TO AUTOMATIC TURNTABLE PLAYER CONVERSION

TECHNICAL FIELD

The present invention relates to record players. More specifically, a device for converting a manual record player to an automatic record player is provided.

BACKGROUND INFORMATION

Despite the prevalence of music sold on compact discs and MP3 files, records are still regarded by some audiophiles as producing the best sound quality when playing the music stored thereon. Record players rely on a tone arm having a needle or stylus that follows a spiral, modulated groove defined within the surface of the record. The stylus is operatively connected to an electromagnetic pickup, which converts the stylus movements into an electrical signal. This electrical signal is amplified and then supplied to a speaker. While CD's and MP3 files store the music digitally, records store the music in an analog format.

Unlike CD's or MP3 files, users of manual record players must manually move the record player's tone arm to the starting location of the desired song on the record. Various automatic record players automatically detect the locations between songs, and position the tonearm accordingly. However, the additional hardware needed for automatic tone arm movement increases the weight of the tonearm, which impacts the sensitivity of the tonearm. While some manual record players can track to 0.5 grain, the best automatic record players can only track to 1.5 grains, thus reducing the sound quality of the record player.

An example of a presently available automated record player system is U.S. Pat. No. 4,398,278, which discloses a record player program selector. The programs on the record are separated by inter-program gaps. The reflectivity of the surface of the record at locations where sound grooves are located is different from the reflectivity of the surface of the inter-program gaps. A photo sensor mounted on the housing of the turntable is utilized to determine the location of each inter-program gap. The location of the lead-in groove of the record can also be detected using the light sensor. The desired track is selected using a selector switch, and the inter-program gap located before the desired program is set as the location to which the tone arm should be moved. A light source and light sensor on the tonearm is used in connection with an optically detectable radial scale to determine the position of the tonearm as it moves across the surface of the record. The tonearm position sensor is compared to the inter-program gap signal to determine whether the tonearm is in the location of the selected program. Alternatively, the radial scale can be spaced magnetic elements that are sensed by a magnetic sensor on the tonearm. The user may select the desired track using a selector switch.

DE 2839801 discloses a record player tone arm vertical and rotary motion control. A follower and lift platform coaxial with the tone arm and driven by the player motor is used. The device can be controlled remotely.

JP 62257601 discloses a remote control for a record player, allowing the tonearm to be elevated and then rotated to a desired position on a record.

JP 58215701 discloses a device for engaging the tonearm and a lifting mechanism. The tonearm is free to move horizontally when the lifting mechanism is disengaged.

JP 58102303 discloses an elevator for a tonearm. The elevator includes an auxiliary arm on the tonearm, and a receiving plate for contacting the auxiliary arm. The receiving plate is part of a piston rod.

U.S. Pat. No. 4,694,449 discloses a record player with a pickup arm lift rod. The lifting device includes a horizontal arm support formed integrally with a vertical lifting rod. The lifting rod fits within a square tubular guide element that is integrally formed with the deck. The lower end of the lift rod engages an actuating member having a pair of support surfaces at different levels, connected by a ramped surface. Sliding the actuating member thereby raises and lowers the lift rod. An angled compression spring both biases the lift rod downward, and pushes the lift rod against a pair of the guide surfaces. Silicon lubricant is maintained between the lift arm and the guide surfaces by capillary action.

U.S. Pat. No. 4,437,180 discloses an apparatus for controlling a pickup arm in a record or video disc player. An optical detector is located at the foremost end of the pickup arm for detecting a non-recorded groove portion. The tonearm moves until a selected non-recorded groove portion is reached, and then the tonearm is lowered. The light sensor includes an LED and a phototransistor. A pickup arm position detecting section includes a photo coupler having a light emitting diode and a phototransistor facing each other, with a shutter plate. A counter is used to track the number of the song on which the stylus is positioned. A second counter, which is set by the number of depressions of the play button, is used to select the desired song. A pickup arm lifter controlling circuit is used to raise the pickup arm when the stop button is depressed, and to lower the pickup arm when the pickup arm is in a desired location. A pickup arm horizontal controlling circuit moves the pickup arm towards the center of the record, unless the stop button is depressed, in which case the pickup arm is moved outward. Manual control of the pickup arm is also provided. When operated in automatic mode, the pickup arm is moved inward until the count value equals the designated number of the piece selected. At this point, the pickup arm will overswing the desired location, but then be brought back by the reversing controlling section for a tiny distance, and then positioned accurately above the non-recorded portion of the groove located immediately before the designated number of piece of music. The pickup arm is then lowered.

U.S. Pat. No. 4,301,526 discloses a tonearm control system. The tonearm is moved along a worm gear. A shutter attached to the worm gear is placed between a light source and a light sensor, so that the light pulses detected by the light sensor can be used to indicate the absolute position of the tonearm. A sensor on the on the tonearm detects gaps between grooved sections on a record. The user may elect to play songs on the record in a given order. The tonearm moves to the location of the song from its start position by counting spaces on the record between grooved song sections, remembering each tone arm position in which a section between songs is detected.

U.S. Pat. No. 4,114,893 discloses gramophone equipment incorporating a means of permitting a user to play selected tracks. A photoelectric sensor located at the end of the tonearm is used to detect bands between record tracks. A counter is used to count the detected bands. Track selections may be input and stored into memory. Control circuitry is provided for lifting the tonearm as well as for driving the tonearm laterally to the desired location.

U.S. Pat. No. 3,937,903 discloses a soundtrack selector system for phonograph record players. The stylus pickup arm includes an infrared light emitter and light sensor, directing light to the face of the phonograph record and receiving reflected light. Bands between recorded songs are thereby detected. An optical encoder is used to detect the peripheral position of the pickup arm with respect to the record. The pickup arm is moved using a pulse motor that is geared down sufficiently to give the necessary incremental resolution. The use of the encoder's output signal to supplement the detector signal in the pickup arm eliminates the elaborate optical detection techniques utilized by other systems. The user may select the specific bands of the record to be played. The system can be extended to multiple records, tracking not only the band being played but also the record within the group of records that is being played.

U.S. Pat. No. 3,727,922 discloses a tonearm lifting device for an automatic record player. The lifting mechanism includes a cylinder with a piston slidably mounted therein. A lifting rod is secured within the piston, and a lifting plate for the tonearm is mounted on the lifting rod. An eccentric cam is used to move the piston upward.

JP 60131602 discloses the use of a remote control solenoid for raising and lowering the tonearm of a record player.

U.S. Pat. No. 4,226,425 discloses a nonrecorded section detection scanner mounted on a sensor arm. The sensor arm is mounted to a rotating shaft having a drive mechanism and a slit plate fixed to the shaft. The slit plate is used to detect to the rotation of the shaft so that the location of nonrecorded sections between adjacent tracts of a record can be located. The tonearm includes a drive shaft having another slit plate to detect the address of the pickup cartridge. Each of the slip plates includes a slit plate sensor having a light emitting diode on one side of the slit plate, and a photosensitive transistor on the other side of the slit plate. A counter is connected to each of the sensors to count the pulse signals derived therefrom.

Accordingly, there is a need for an automatic record player having the tonearm sensitivity of a manual record player. There is a further need for a means of converting a manual record player to an automatic record player without affecting the sensitivity of the tonearm. Additionally, there is a need for a manual to automatic record player conversion that minimizes the amount of weight added to the tone arm.

SUMMARY

The above needs are met by a manual to automatic conversion device for record players. The conversion device has a base unit that is structured to be secured to the housing of the manual record player below a portion of the range of motion of the tonearm. The base unit has a piston assembly. The piston assembly includes a piston that is movable between a lower position and an upper position. The piston is structured to engage a piston-engaging tonearm element, and to elevate the tonearm, when the piston is in its upper position. The piston is further structured to disengage the piston-engaging tonearm element when in the lower position. The conversion device further has a first motor assembly. The first motor assembly is structured to move the piston between its lower position and its upper position. The conversion device additionally includes a drive assembly having a second motor assembly. The second motor assembly is operatively connected to the piston assembly. The drive assembly is structured to move the piston assembly between a first position and a second position. The first position corresponds to the rest position of the tonearm, and the second position corresponds to the record ending position of the tonearm. The conversion device also includes a control system. The control system is structured to selectively raise and lower the piston, and to selectively move the piston assembly towards the first position and the second position. The tonearm may thereby be moved to a preselected position by moving the piston assembly under the piston-engaging tonearm element, raising the piston, moving the piston generally horizontally until the tonearm is in a preselected position, and lowering the piston.

The above needs are also met by an automatic record player. The automatic record player has a record player housing and a turntable rotatably secured to the record player housing. The automatic record player includes a tonearm that is structured for movement between a rest position and a record ending position adjacent to a central portion of the turntable. The tonearm defines a range of tonearm motion between the rest position and the record ending position. The automatic record player also includes a base unit disposed on the record player housing below a portion of the range of motion of the tonearm. The base unit has a piston assembly. The piston assembly has a piston that is movable between a lower position and an upper position. The piston is structured to engage a piston-engaging tonearm element, and to elevate the tonearm, when the piston is in its upper position. The piston is further structured to disengage the piston-engaging tonearm element when in the lower position. The automatic record player additionally has a first motor assembly that is structured to move the piston between its lower position and its upper position. The automatic record player also has a drive assembly having a second motor assembly. The second motor assembly is operatively connected to the piston assembly. The drive assembly is structured to move the piston assembly between a first position and a second position. The first position corresponds to the rest position of the tonearm, and the second position corresponds to the record ending position of the tonearm. The automatic record player further has a control system that is structured to selectively raise and lower the piston, and to selectively move the piston assembly towards the first position and the second position. The tonearm may thereby be moved to a preselected position by moving the piston assembly under the piston-engaging tonearm element, raising the piston, moving the piston generally horizontally until the tonearm is in a preselected position, and lowering the piston.

The above needs are further met by a control system for an automatic record player. The automatic record player has a tonearm and a motor-driven piston assembly for moving the tonearm. The control system includes a central processing unit operatively connected to the motor-driven piston assembly. The central processing unit is structured to cause the motor-driven piston assembly to move the tonearm to a preselected location. The control system further has a tracking system that is structured to track a location of the motor-driven piston assembly and the tonearm. The tracking system is operatively connected to the central processing unit. The control system also includes a local database structured to store a plurality of positions of starting locations of songs on a record. The database is operatively connected to the central processing unit. The central processing unit controls the motor-driven piston assembly to move the tonearm to a location that is stored within the local database.

The above needs are additionally met by a method of determining song starting positions on a record. The method includes providing an automatic record player having a tonearm, a motor-driven piston assembly for moving the tonearm, and a control system. The control system includes a central processing unit operatively connected to the motor-driven piston assembly. The central processing unit is structured to cause the motor-driven piston assembly to move the tonearm to a preselected location. The control system further has a tracking system that is structured to track a location of the motor-driven piston assembly and the tonearm. The tracking system is operatively connected to the central processing unit. The control system also has a local database structured to store a plurality of positions of starting locations of songs on a record. The database is operatively connected to the central processing unit. The method further includes identifying song starting points based on a distance of travel of the motor-driven piston assembly or a distance of travel of the tonearm required to move a tonearm from a predetermined position to the starting point of each song.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
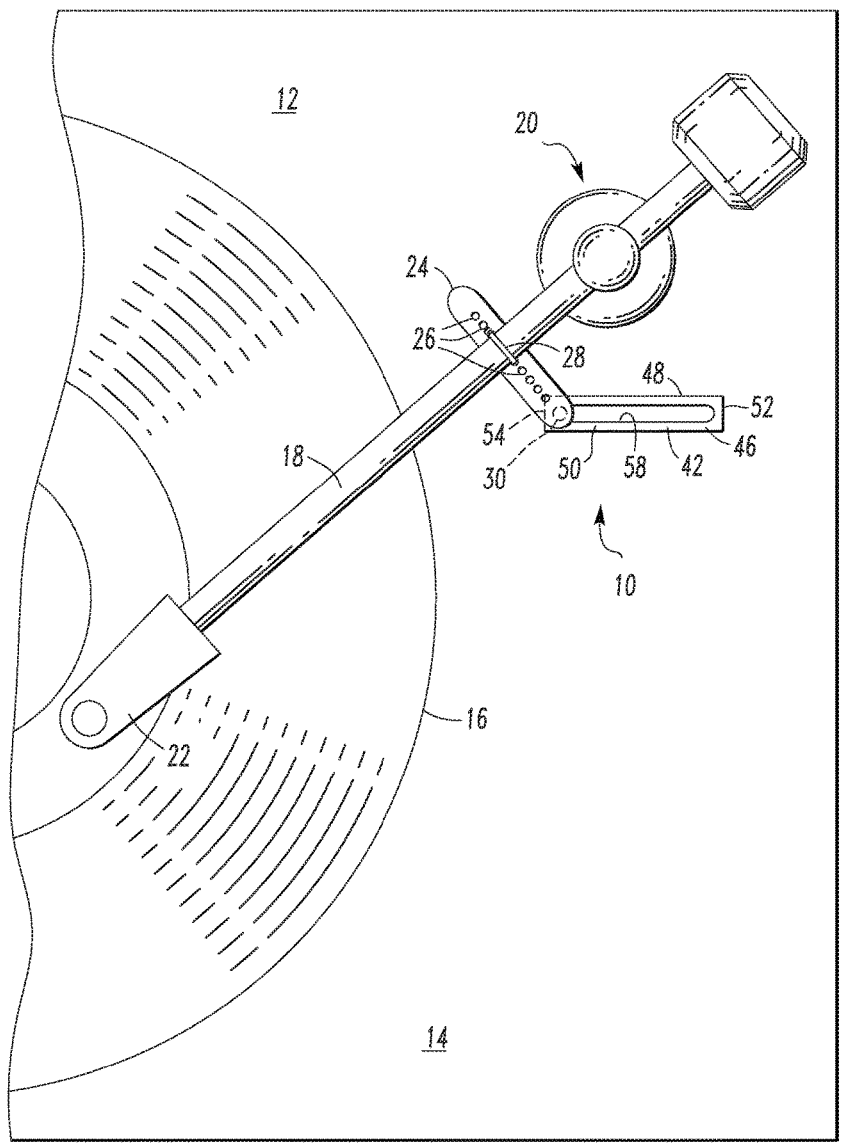
FIG. 1 is a top plan view of a manual record player having a manual to automatic record player conversion device, showing a first mounting orientation, and the tone arm positioned over the record.

Referring to the drawings, an example of a manual to automatic record player conversion device 10 is illustrated. The manual record player with which the conversion device 10 is used is well known to those skilled in the art, and is therefore only described briefly herein. The manual record player 12 includes a housing 14 supporting a turntable 16 and tonearm 18. The tonearm 18 includes a pivot assembly 20 that is structured to provide for both horizontal and vertical rotation of the tonearm 18 about the pivot assembly 20, and a record engaging end 22 having a stylus operatively connected to an electromagnetic pickup therein.

Referring to FIGS. 1-6, the device 10 includes a blade 24, which in the illustrated example is generally elongated, is made of a rigid, lightweight material, and is structured for attachment to the tonearm 18. Suitable materials for the tonearm 18 include, but are not limited to, aluminum alloys, titanium, and a variety of rigid polymers. It is generally preferable to attach the blade 24 to the tonearm 18 as close is practical to the pivot structure 20, thereby minimizing the impact of the weight of the blade 24 on the sensitivity of the tonearm 18. In the illustrated example of the blade 24, a plurality of apertures 26 are defined along its length for receiving a fastener 28 passing around the tonearm 18 and through two of the apertures 26. The plurality of mounting holes defined within some examples of the blade 24 provide a means for adjusting the position of the blade 24 with respect to the tonearm 18, thus ensuring that some portion of the slot 32 as described below is always positioned for engagement by the piston 72 as described below, regardless of the position of the tonearm 18. Although in the illustrated example the blade 24 is generally perpendicular to the tonearm 18, other orientations with respect to the tonearm 18 may be used without departing from the invention.

The blade 24 includes a piston engaging end 30, defining a slot 32 therein. In the illustrated example, the slot 32 is generally perpendicular to the blade 24, but other orientations of the slot 32 are possible without departing from the invention depending upon the specific installation of the device 10 on the record player 12, as described in greater detail below. Some examples of the slot 32 can be partially defined by an upwardly extending sidewall 34, which in the illustrated example is frustoconical. The piston engaging end 30 of the blade 24 also includes a reflective strip 36, which in the illustrated example is elongated and generally parallel to the slot 32. The opposite end 38 of the blade 24 includes a lip 40 in the illustrated example.

Figure 7:
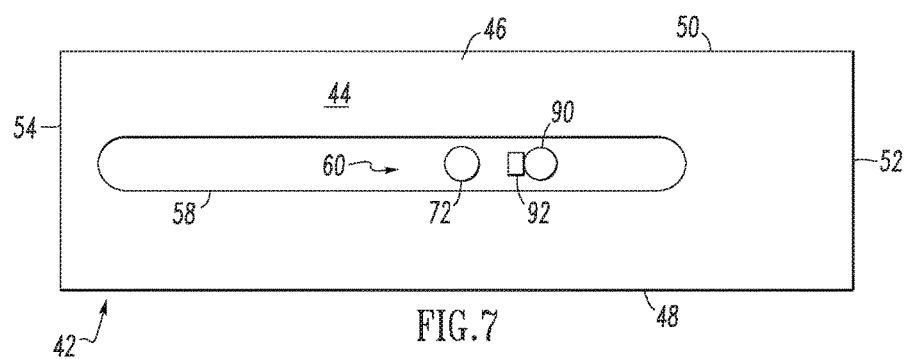
FIG. 7 is a top view of a base unit for the manual to automatic record player conversion device of FIG. 1.
Figure 8:
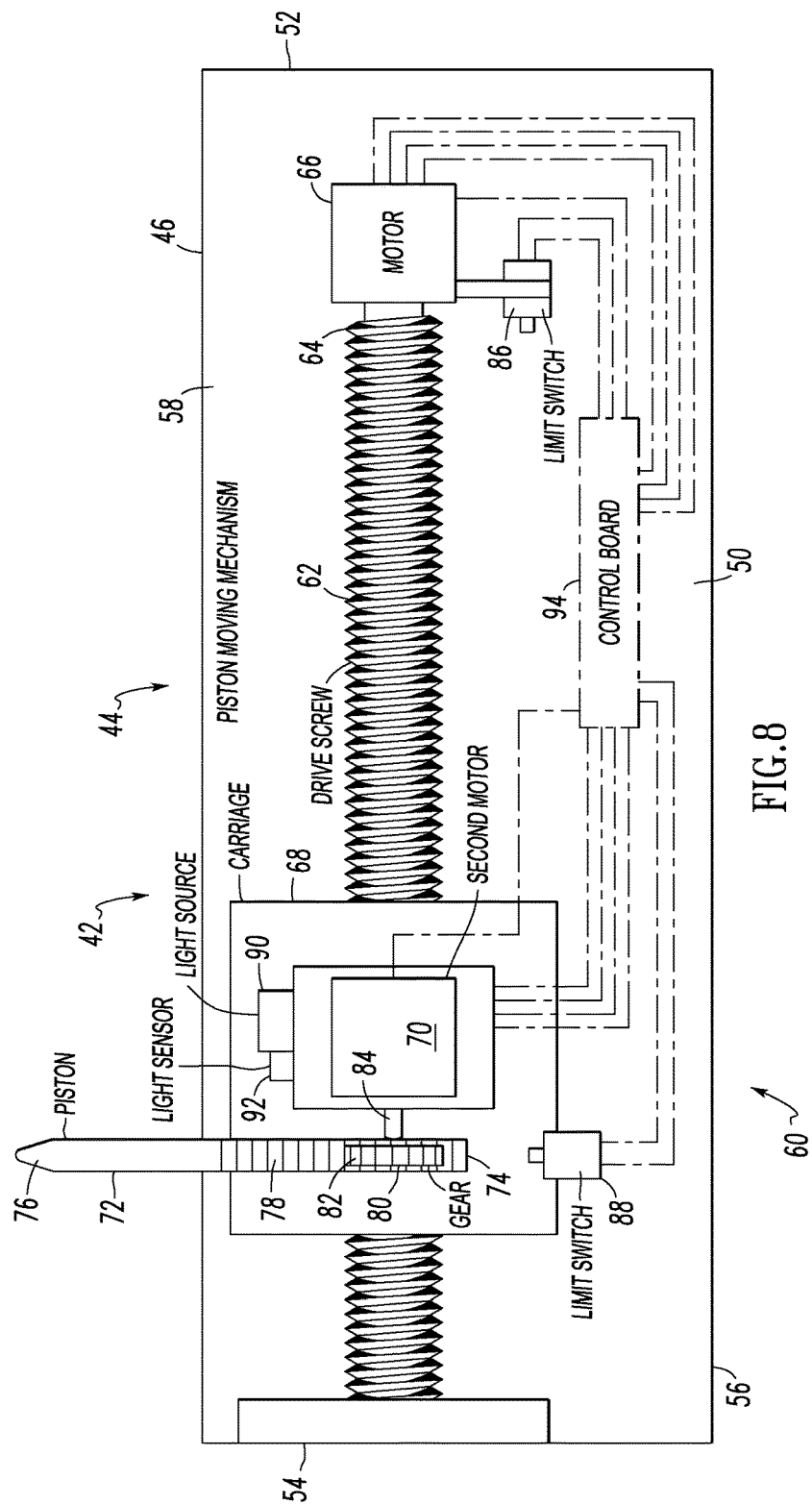
FIG. 8 is a partially cutaway side elevational view of the base unit for a manual to automatic record player conversion device of FIG. 1.
Figure 9:
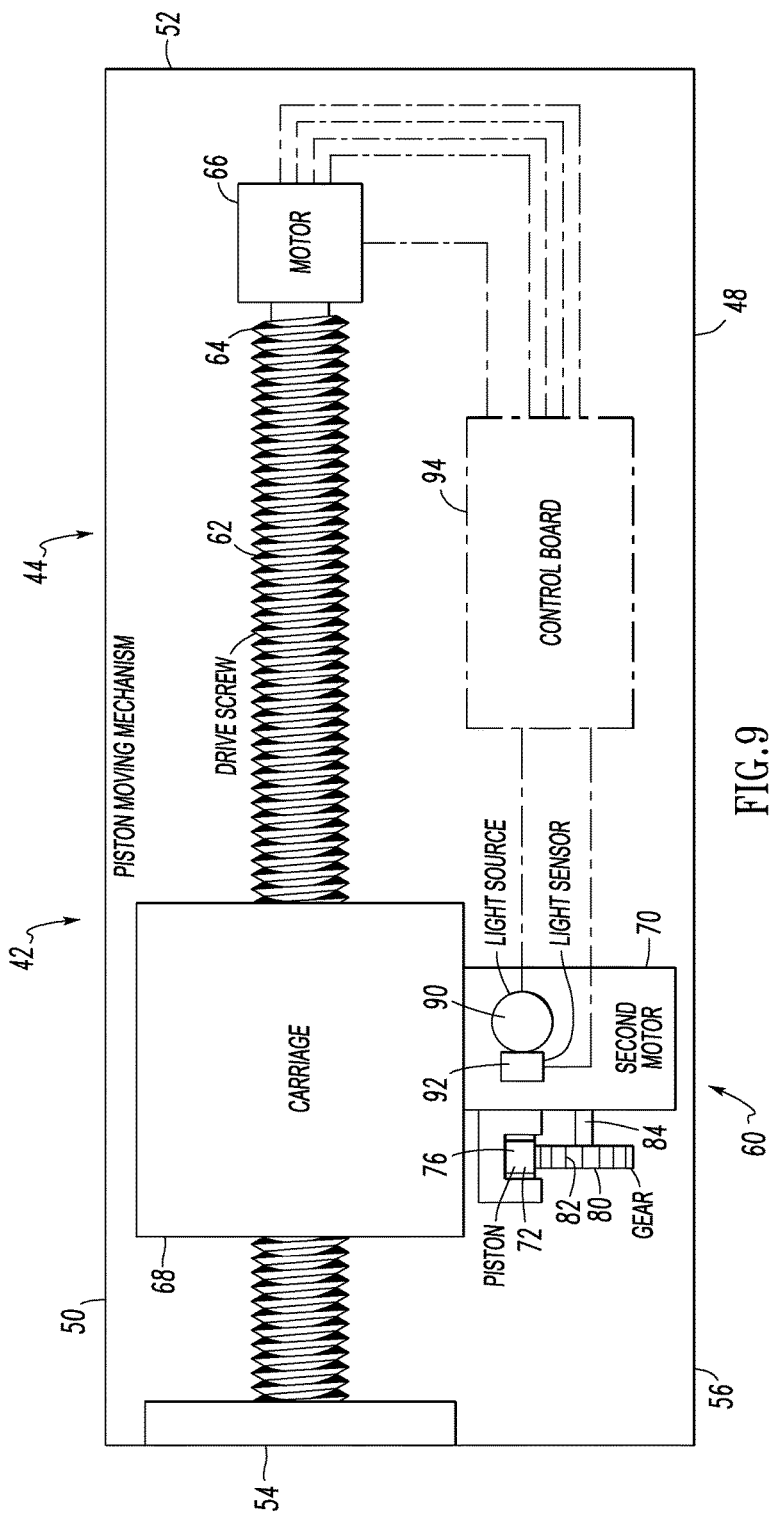
FIG. 9 is a partially cutaway top plan view of the base unit for a manual to automatic record player conversion device of FIG. 1.

Continuing to refer to FIGS. 1-6 as well as FIGS. 7-9, the base unit 42 of the device 10 includes a housing 44 having a top 46, opposing sides 48, 50, opposing ends 52, 54, and a bottom 56. The top 46 defines a slot 58 therein, with the slot 58 of the illustrated example being generally parallel to the housing 44. The bottom 56 is structured to be secured to the housing 14 of the record player. Securing the bottom 56 to the housing 14 of the record player can be accomplished using a variety of methods, including temporary or permanent adhesives, hook and loop fasteners, corresponding fastener portions having interlocking mushroom shaped fasteners, of the type marketed under the trademark DUAL LOCK by 3M, located in St. Paul, Minn., or using mechanical fasteners such as screws or rivets.

Figure 2:
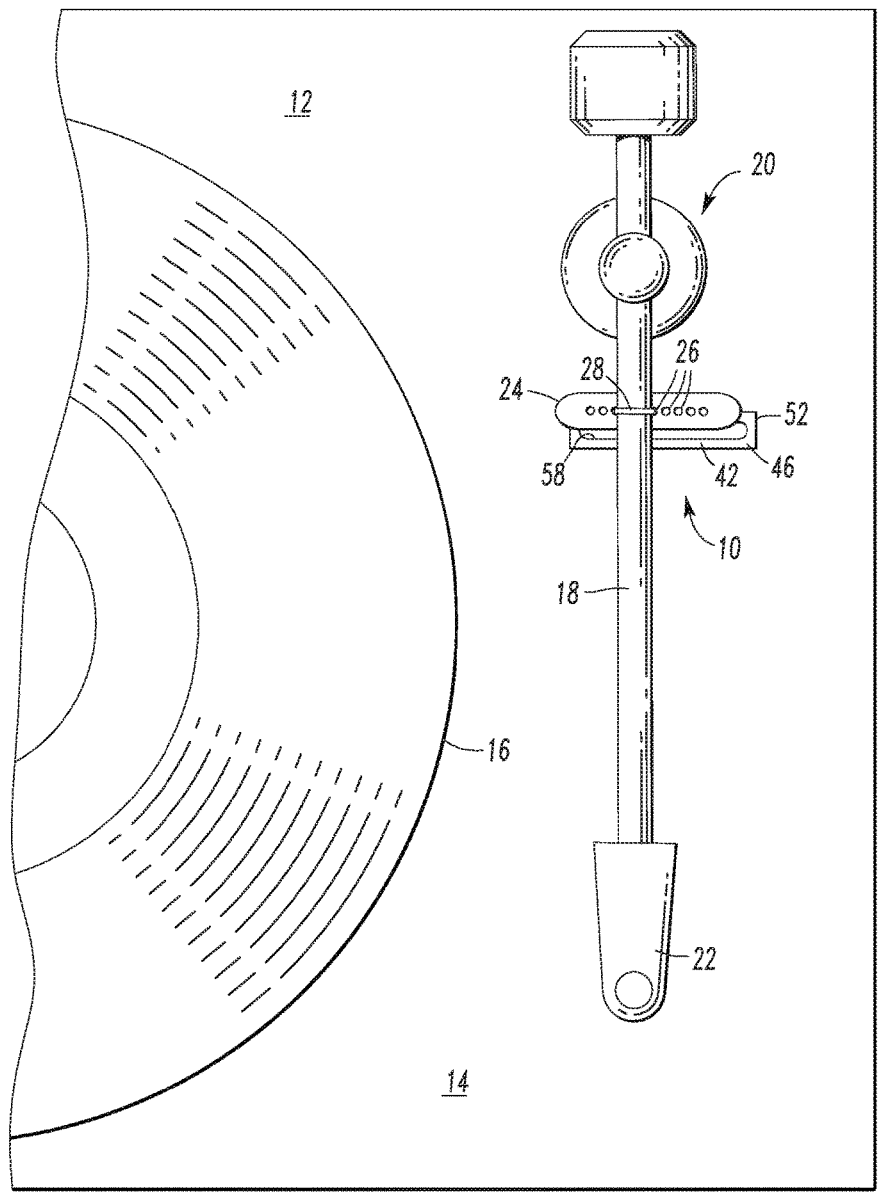
FIG. 2 is a top plan view of manual record player having a the manual to automatic record player conversion device of FIG. 1, showing a first mounting orientation, and the tone arm positioned in its rest position.
Figure 3:
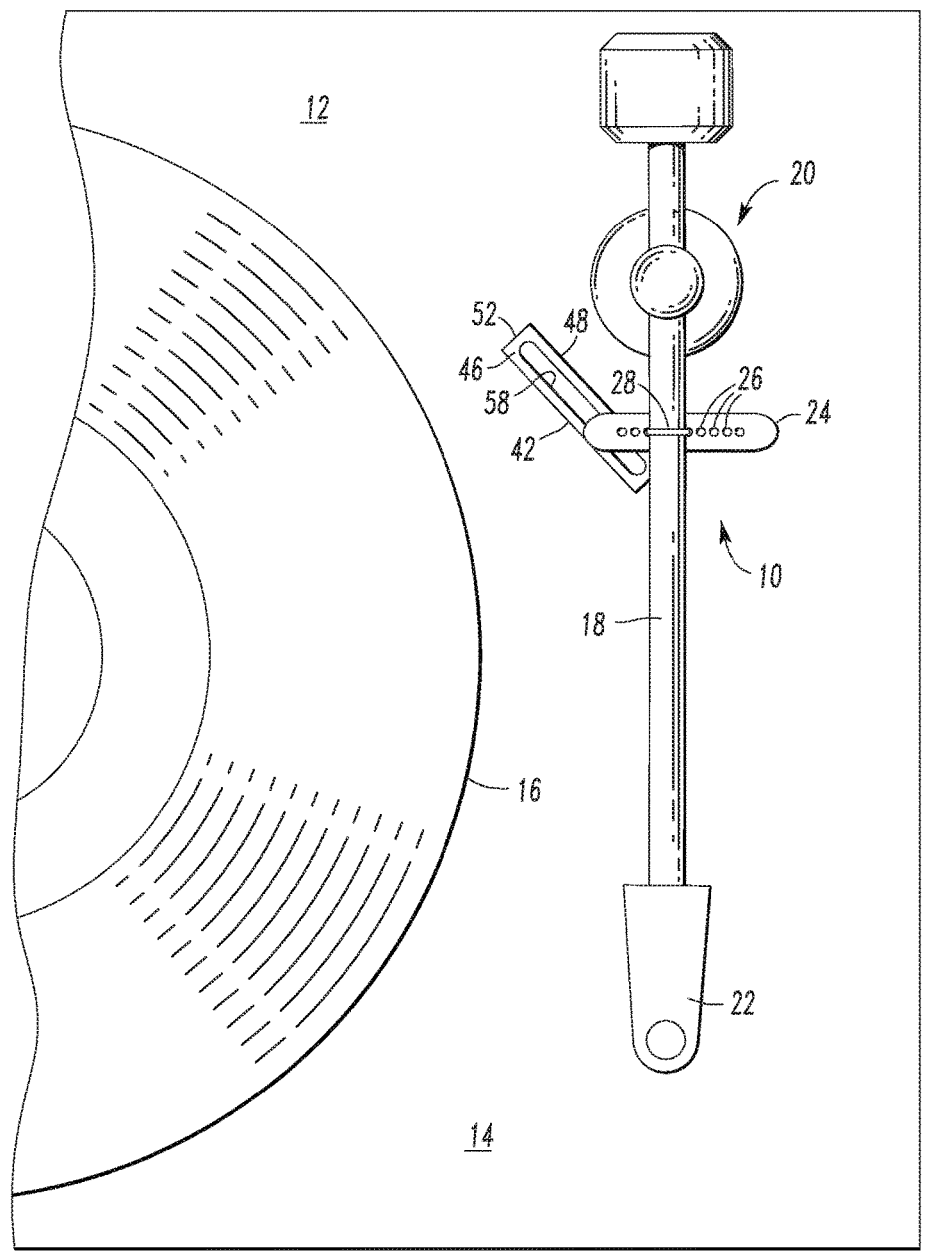
FIG. 3 is a top plan view of manual record player having a the manual to automatic record player conversion device of FIG. 1, showing a second mounting orientation, and the tone arm positioned in its rest position.
Figure 4:
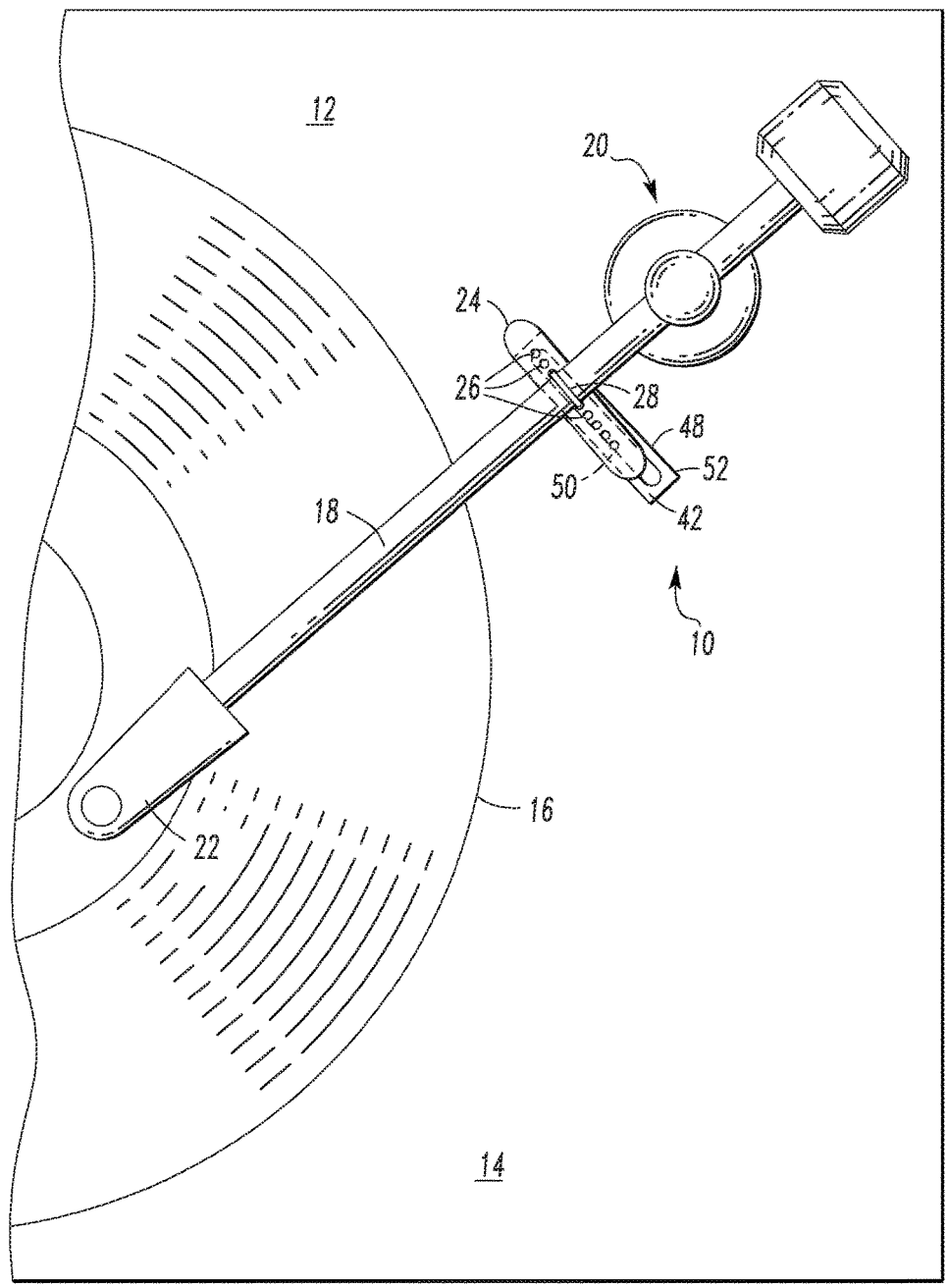
FIG. 4 is a top plan view of manual record player having a the manual to automatic record player conversion device of FIG. 1, showing a second mounting orientation, and the tone arm positioned over the record.

The housing 44 can be secured to the record player housing 14 in either the first (standard) position illustrated in FIGS. 1-2, or the second (reverse) position illustrated in FIGS. 3-4, as described in greater detail below. In the standard position of FIGS. 1-2, the housing 42 is oriented so that the housing 42 is generally perpendicular to a tangent to the edge of the turntable 16. In the reverse position of FIGS. 3-4, the housing 42 is oriented generally parallel to a tangent to the turntable 16. In either case, the housing 42 is positioned relatively close to the pivot assembly 20 of the tonearm 18. Mounting structures of different heights can be utilized to accommodate different record players 12. In all cases, exact positioning of the blade 24 on the tonearm 18 as well as the exact positioning of the housing 42 on the record player housing 14 is determined to permit automated movement of the tonearm 18 between its rest position and its position within the lead out groove of a record on the turntable 16.

Referring more specifically to FIGS. 7-9, the piston moving mechanism 60 is illustrated. The illustrated example of piston moving mechanism 60 includes a drive screw 62 that is operatively connected at its first end 64 to a motor 66. The illustrated example of the motor 66 is an electrical stepper motor 66 that is capable of being driven by a calibrated stepper motor drive system that provides positional feedback based on an initial position of the stepper motor and degree of rotation from that initial position. The drive system for the illustrated example of the stepper motor 66, which is not described in detail herein because stepper motor drive systems are well known to those skilled in the art, includes to output drivers, with each driver having reversing polarity.

A carriage 68 is threadedly engaged to the drive screw 62 so that rotation of the drive screw 62 causes translation of the carriage 68 along the length of the drive screw 62. The illustrated example of the carriage 68 includes another motor 70, which in some examples may be the same type of motor as the stepper motor 66. If an electrical stepper motor that is capable of being driven by a calibrated stepper motor drive system is selected as the motor 70, and the position of the motor 70 is also known based on the initial position and degree of rotation. The motor 70 is used to raise and lower a piston 72 having a lower portion 74 and an upper and 76. The illustrated example of the upper end 76 of the piston 72 has a tapered configuration, with the taper of the upper end 76 substantially matching the angle of the side wall 34 of the slot 32. The upper end 76 of the piston 72 has a width that is approximately equal to or greater than the width of the slot 32.

The lower portion 74 of the piston 72 Includes piston drive engaging elements. In the illustrated example, the lower portion 74 includes a plurality of teeth 78 extending along one side of the piston 72. The teeth 78 are structured to mesh with the teeth 80 of the gear 82 that is connected to the drive shaft 84 of the motor 70. Thus, rotation of the motor 70 and a first direction rotates the gear 82 in a direction that raises the piston 72. Similarly, rotation of the motor 70 in the opposite direction rotates the gear 82 and a direction that lowers the piston 72.

A limit switch 86 is disposed adjacent to one end of the drive screw 62, so that when the carriage 68 reaches its limit of travel at that and of the drive screw 62, the limit switch 86 is activated, providing a signal indicating the location of the carriage 68. Once the limit switch 86 has been activated, the position of the carriage 68 is known by tracking the rotation of the motor 66. Similarly, a limit switch 88 is disposed adjacent to one end of travel of the piston 72, so that the limit switch 88 is activated when the piston 72 is at one extreme of its range of travel. In the illustrated example, the limit switch 88 corresponds to the lowermost position of the piston 72. Once the limit switch 88 has been activated, the position of the piston 72 can be tracked by tracking rotation of the motor 70. Although the illustrated example utilizes stepper motors with position indicating drivers, other alternative devices and methods for tracking movement, for example, utilizing encoders, would not depart from the scope of the invention.

A light source 90, which in the illustrated example is a light emitting diode, and a light sensor 92, which in the illustrated example can be either a photodiode or phototransistor, are positioned adjacent to each other on the carriage 68. The light source 90 is positioned to direct light upward through the slot 58, and the light sensor 92 is positioned to receive light reflected downward through the slot 58. Thus, when the light source 90 is positioned under the reflective strip 36 of the blade 24, the reflective strip 36 will reflect light from the light source 90 to the light sensor 92, thus indicating the position of the carriage 68 with respect to the blade 24. The positioning of the reflective strip 36 with respect to the slot 32, as well as the positioning of the light source 90, light sensor 92, and piston 72, are selected so that when the light source 90 and light sensor 92 are positioned below the reflective strip 36, the piston 72 is below the slot 32. In this position, raising the piston 72 will cause the tapered top end 76 of the piston 72 to engage the angled side wall 34 of the slot 32, thus raising the tonearm 18. Movement of the carriage 68 along the drive screw 62 will then move the tone arm 18 from its current position to a desired position. The piston 72 can then be lowered to lower the tonearm 18. The slot 32 is structured to accommodate the difference between the longitudinal motion of the carriage 68 as well as the rotational motion of the tonearm 18. The tapered top end 76 of the piston 72 and angled side wall 34 of the slot 32 accommodate and correct any positioning errors between the piston 72 and slot 32.

Figure 5:
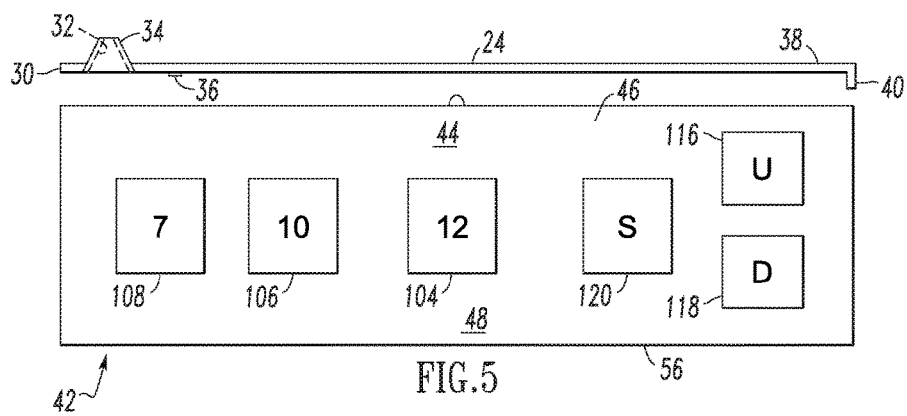
FIG. 5 is a side elevational view of the manual to automatic record player conversion device of FIG. 1.
Figure 6:
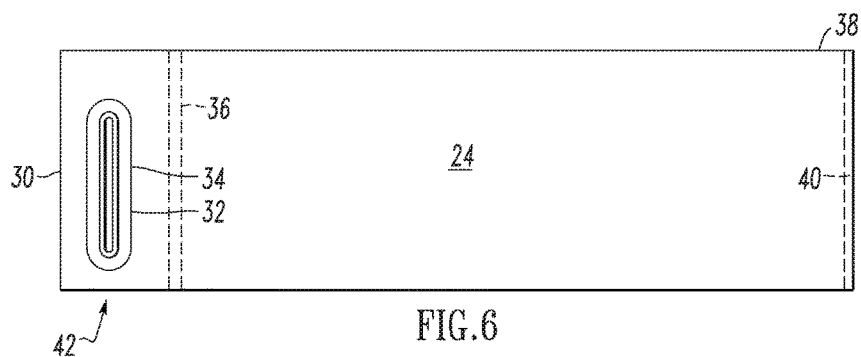
FIG. 6 is a top view of a blade for the manual to automatic record player conversion device of FIG. 1.
Figure 10:
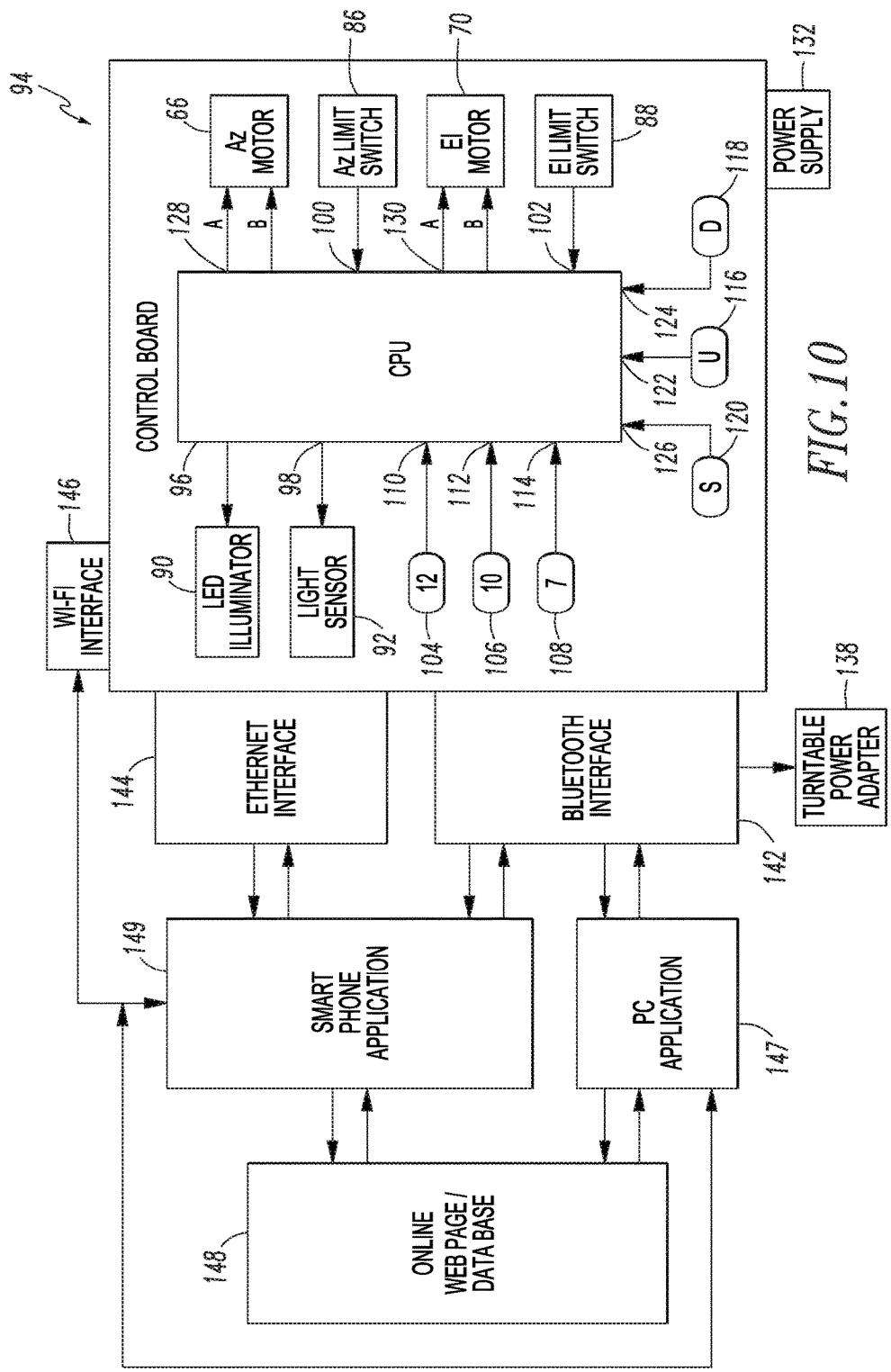
FIG. 10 is a schematic diagram of the electrical components of the manual to automatic record player conversion device of FIG. 1.

Referring to FIGS. 5, 9, and 10, a control board 94 and associated control hardware is illustrated. The control board 94 includes a central processing unit 96, which in the illustrated example is a microcontroller. The microcontroller 96 can be selected from a variety of different types of controllers. Possible microcontrollers 96 include general-purpose programmable microcontrollers, programmable logic devices such as field programmable gate arrays, application specific integrated circuits, and custom integrated circuits. The microcontroller 96 includes a variety of input and output ports for receiving information and commands as well as for outputting control signals. In the illustrated example, the microcontroller 96 includes a light sensor port 98, as well as limit switch ports 100, 102 for the limit switches 86, 88, respectively. The illustrated example provides a control for selecting the size of the record, which in the illustrated example includes the button 104 for selecting a 12 inch record, button 106 for selecting a 10 inch record, and button 108 for selecting a 7 inch record. The signals from the buttons 104, 106, 108 are provided to the ports 110, 112, 114, respectively. The illustrated example also provides buttons 116 for raising the tonearm, button 118 for lowering the tonearm, and button 120 for moving the tonearm onto the turntable rest. The buttons 116, 118, 120 are provided to input ports 122, 124, 126, respectively. Signals to the motor 66 are provided through output port 128. Similarly, signals to the motor 70 or provided through output port 130.

Figure 17:
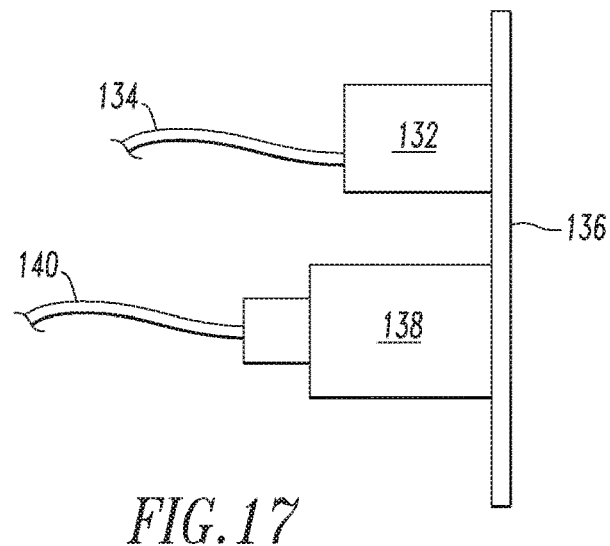
FIG. 17 is a top plan view of is a top plan view of a manual record player having a manual to automatic record player conversion device of FIG. 1, showing a power supply.

A power supply 132 is provided. In the illustrated example, the power supply 132 (FIG. 17) includes a power cord 134 for connecting to a standard 110 V outlet 136. Additionally, a plug unit 138 is provided between the power cord 140 of the turntable 12 and the wall outlet 136. The plug unit 138 is equipped with a switch, as well as a microcontroller connected to the switch. The microcontroller includes a wireless receiver such as Bluetooth, Wi-Fi, or other wireless technology, so that the plug unit 138 can communicate with the control board 94. The plug unit 138 can thus be used to switch on and off power to the turntable 12. Thus, electrical power can be supplied or deactivated to the turntable 12 by the control board 94. Some examples of the device 10 may always be in the on state, so that the condition of the turntable is always known to the device 10. Some examples of the device 10 may be configured to supply power to the turntable 12 upon the tonearm 18 being moved from its rest position, and to deactivate power to the turntable 12 upon the tonearm 18 being returned to its rest position.

Some examples of the control board 94 may also include provisions for remote control of the device 10, and/or the use of externally stored information in controlling the device 10, as explained in greater detail below. In the illustrated example, a Bluetooth interface 142 may be utilized to communicate with either a smart phone that has been provided with appropriate software, commonly known as an application or "app," or with a computer. Communication with a computer may also take place through a Wi-Fi interface 146. Either a computer 147 or smart phone 149 with appropriate software may communicate with an Internet database 148 containing information about various record albums. Information from the Internet database, as well as locally generated information which is generated as described below, may also be stored in a local database.

FIGS. 12-16 illustrate the steps performed by the device 10 during initialization, determining the location of track starting points on a record, and playing user-selected tracks. Beginning with FIG. 16, when power is turned on at step 150, the motor 66 is activated to drive the carriage 68 towards the limit switch 86, and so the limit switch 86 is contacted, at step 152. At this point, the location of the carriage 68 along the drive screw 62 is known, and will remain down through tracking the degree of movement of the motor 66. Similarly, at step 154, the motor 70 is actuated to lower the piston 72 until the limit switch 88 is contacted. At this point, the location of the piston 72 is known, and future movement of the position can be tracked by tracking the degree of movement of the motor 66. At step 156, the process enters the tracking mode depicted in FIG. 12.

Tracking mode is entered at step 158, at which point the system determines the next desired step. If, for example, a queue command is detected at step 160, then the system is directed towards the queuing mode subroutine a FIG. 14 at step 162. Otherwise, the system proceeds to step 164 to determine whether calibration is needed or desired. If so, then the system is directed to the calibration subroutine of FIG. 15 at step 166. Calibration mode begins at step 168 by inquiring of the user whether the base unit 42 is mounted in the orientation of FIGS. 1-2 (standard mounting) or the orientation of FIGS. 3-4 (reverse mounting). The mounting orientation determines which end of the range of motion of the carriage 68 corresponds to the rest position of the tonearm 18, and which end of the range of motion of the carriage 68 corresponds to the center most position of the tonearm 18 with respect to a record on the turntable 16. Once the position of the base unit 42 is determined, the position of the motors 66, 70 that corresponds to the rest position of the tonearm 18 can be determined at step 170. Next, the position of the motors 66, 70 corresponding to the location of the lead-in groove of a 12 inch record is determined at step 172. The motor positions corresponding to the record surface height at the end of the record is next determined at step 174. Lastly, the end of the lead out groove position is determined at step 176, and the system returns to the tracking algorithm at step 178.

Subsequent operation of the device 10 relies on determining the position of the slot 32 within the blade 24, and maintaining the piston 72 in position underneath the slot 32. The system checks to see whether the position of the tonearm 18 is known at step 178. If not, the motor 66 is activated at step 180 to move the carriage 68 along the drive screw 62 until the light sensor 92 detects light from the light source 90 being reflected from the reflective strip 36 of the blade 24, at step 182. At this point, the piston 72 is positioned underneath the slot 32. The system returns to step 158, at which point the motor 66 is activated as necessary to maintain the position of the piston 72 underneath the slot 32 of the blade 24, with the light sensor 92 providing a signal based on whether or not the carriage 68 is properly positioned. Since the direction of movement of the tonearm 18 while playing a record is known, the direction with which motor 66 must be turned to maintain the position of the carriage 68 with the tonearm 18 is also known. Since the piston 72 is thereby maintained underneath the slot 32 of the blade 24, the piston 72 may be raised to engage the tonearm 18 and move the tone arm 18 to a desired position at any time, as described in greater detail below.

Some examples of the device 10 may include a means for detecting and correcting any positioning errors between the piston 72 and slot 32. The light sensor 72 can continue to monitor reflected light from the reflective strip 34 as the piston 72 is engaged with the slot 32. If positioning errors are detected, the system can make adjustments by utilizing the change in the amount of light received by the light sensor 92 to determine the change in the relative position of the piston 72 and slot 32 that occurred when the piston 72 engaged the slot 32. This positional change can then be factored into subsequent monitoring of the position of the reflective strip 34 with respect to the light sensor 92.

Figure 13:
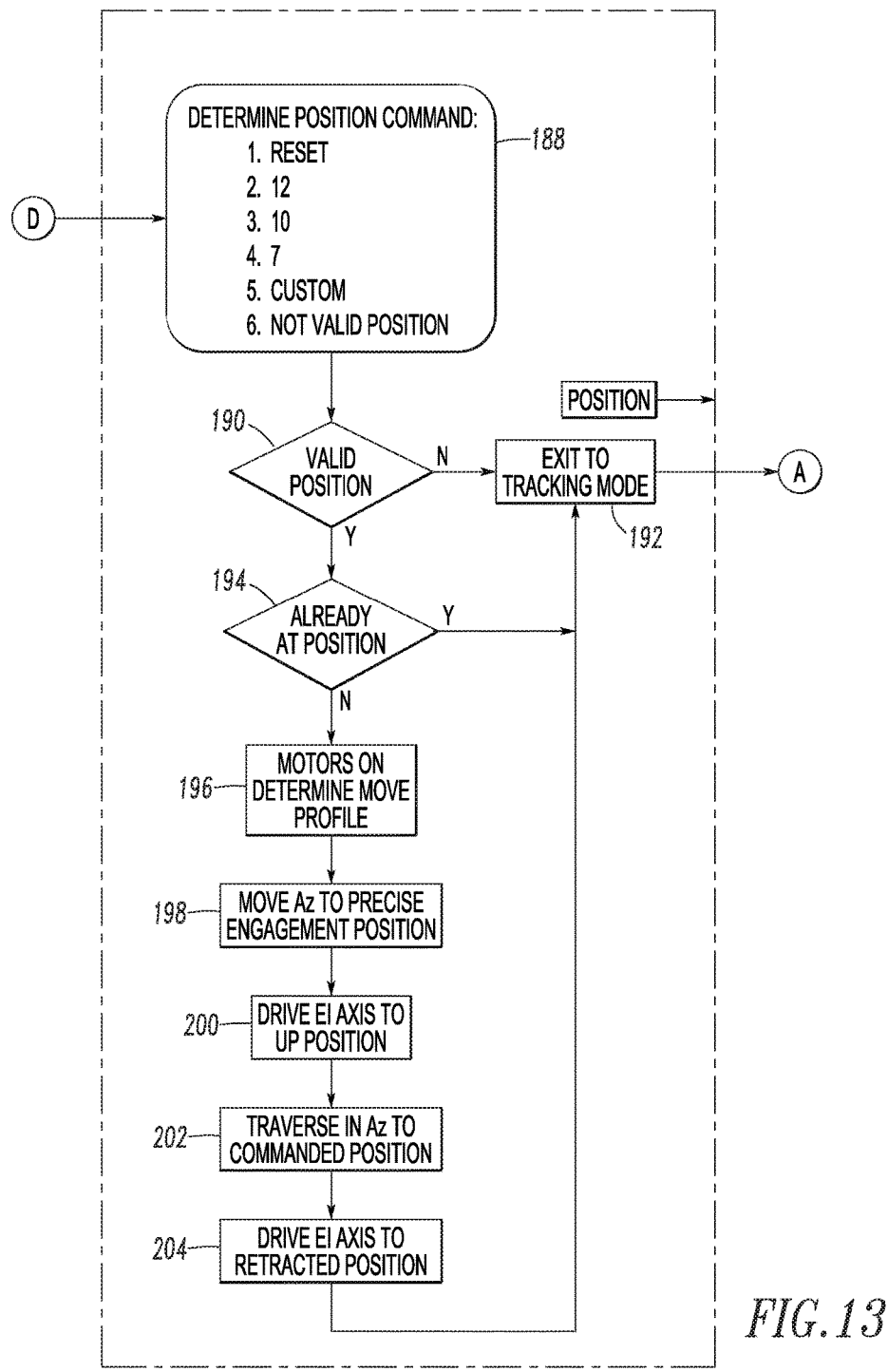
FIG. 13 is a flowchart showing a positioning operation for the manual to automatic record player conversion device of FIG. 1.

If a command to position the tonearm 18 at a given location is received at step 184, then the system will enter the subroutine for positioning the tonearm at step 186. The subroutine is illustrated in FIG. 13. Initially, the specific position command is identified at step 188. Possible position commands could be to move the tone arm 18 to the rest position, to the starting point of a 12 inch record, a 10 inch record, or a 7 inch record, or to move the tonearm 18 to another specified position on the record, most likely corresponding to the starting point of a desired song. If the position commands it is an invalid position, the system returns to the tracking mode at step 192. If the position entered is determined to be a valid position at step 190, the system next checks to see if the tonearm 18 is already in a desired position at step 194. If so, then the system returns to tracking mode at step 192. If not, then the motors are activated in the desired movement direction determined at step 196. The motor 66 is driven to place the piston 72 precisely under the slot 32 at step 198, and the motor 70 is activated to raise the piston at step 200. Once the piston 72 is engage the blade 24, the motor 66 is activated to move the tone arm 18 to the desired position at step 202. At this point, the motor 70 is activated to lower the piston 72, thus lowering the tonearm 18 into contact with the desired location at step 204. With the movement completed, the system returns to the tracking mode from step 192.

Figure 14:
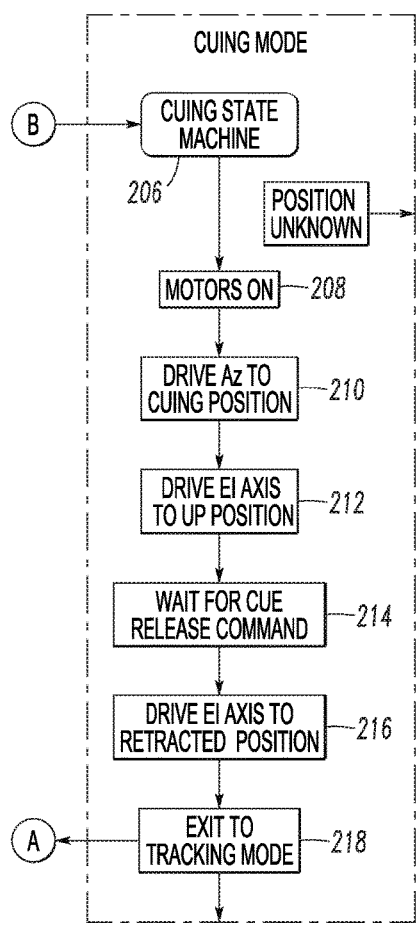
FIG. 14 is a flowchart showing a cueing operation for the manual to automatic record player conversion device of FIG. 1.
Figure 15:
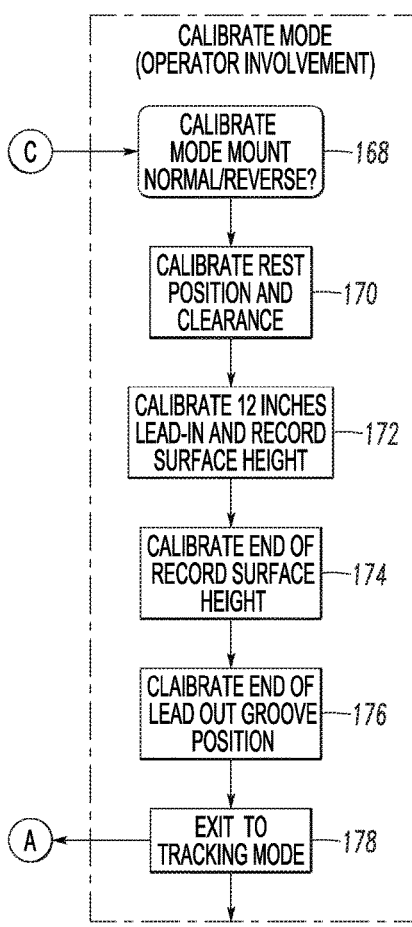
FIG. 15 is a flowchart showing a calibration operation for the manual to automatic record player conversion device of FIG. 1.
Figure 16:
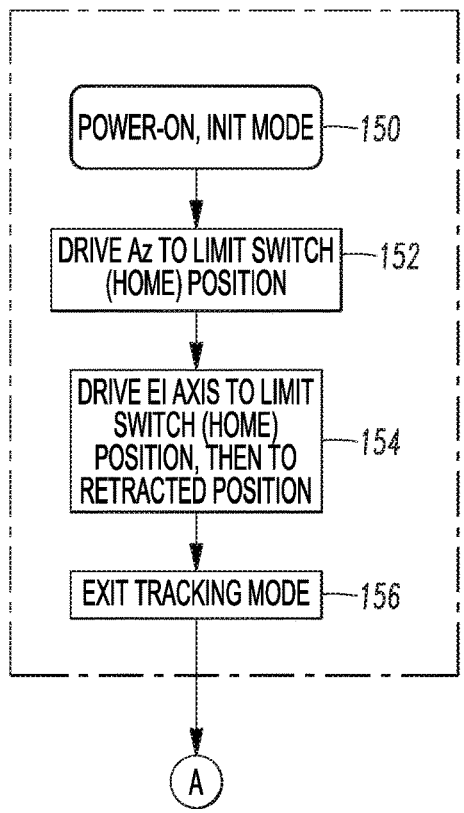
FIG. 16 is a flowchart showing an initialization operation for the manual to automatic record player conversion device of FIG. 1.

Movement of the tonearm 18 can also be accomplished through cuing, with an example queuing subroutine illustrated in FIG. 14. The cuing subroutine is entered at step 206. The motors 66, 70 are engaged at step 208 in preparation to move the tonearm 18. The motor 66 is activated to drive the carriage 68 to the appropriate position under the blade 24 at step 210. The piston 72 is raised at step 212 to engage the blade 24 along a flat portion of the blade 24, permitting the piston 72 to slide relative to the blade 24 as the tonearm 18 is manually moved into the desired position. The piston is lowered at step 216, and tracking mode is reentered at step 218. As another option, movement of the tonearm to the beginning of a 12", 10", or 7" record can be accomplished by pressing either the 12, 10, or 7 button.

Referring back to FIG. 12, whether the lead-out groove of a record has been reached is checked at step 179. If the lead out groove has been reached, then the system enters the rest position as the command position at step 181, and proceeds to the subroutine of FIG. 13 to execute the positioning sequence returning the tonearm 18 to the rest position. The system proceeds to step 183, where the system checks to see if the tonearm is in the rest position. If so, then at step 185, the motors 66, 70 are deactivated and the turntable off command is sent to plug unit 138 while the system awaits the next action. If not, then the motors remain on at step 187, and the system continues to track the tone arm while continuing to await other commands.

The first time a given record is played utilizing the device 10, the locations of the starting points of each song on the record can be determined for future use. After the system is powered on, calibrated is necessary, and begins playing the record, the positions of the tonearm 18, as indicated by the degree of movements of the motor 66, can be recorded in different ways. In some examples, the user may activate a control input such as a button or touch screen icon when the end of each song is reached, thus recording the location of the end of each song. In other examples, because the position of the tonearm 18 is being tracked by rotation of the motor 66 to maintain the position of the carriage 68 underneath the blade 24, the system can be configured to detect the wider grooves in the record, and resulting greater degree of tonearm 18 movements within these grooves, thus recording the location of the end of each song on the record. Once these locations are known, they can be saved for future use, or optionally uploaded into an Internet database for use by others. Because the location of the lead out groove was determined during calibration, the device 10 can be programmed to raise the tone arm 18, and to move the tone arm 18 to the rest position, once the lead out groove has been reached.

Once the starting positions for each song on a record are known, the device 10 can be programmed to play some or all of the songs on the record in a user determined sequence. At the end of each song, the system will raise the tonearm 18, move the tone arm 18 to the starting point of the next song, and lower the tonearm 18 as described above, using the positioning subroutine of FIG. 13. Once the complete list of preselected songs has been played, the device 10 may move the tonearm 18 to its rest position. Pressing the stop button at any time will also cause the tonearm 18 to return to its rest position.

Figure 11:
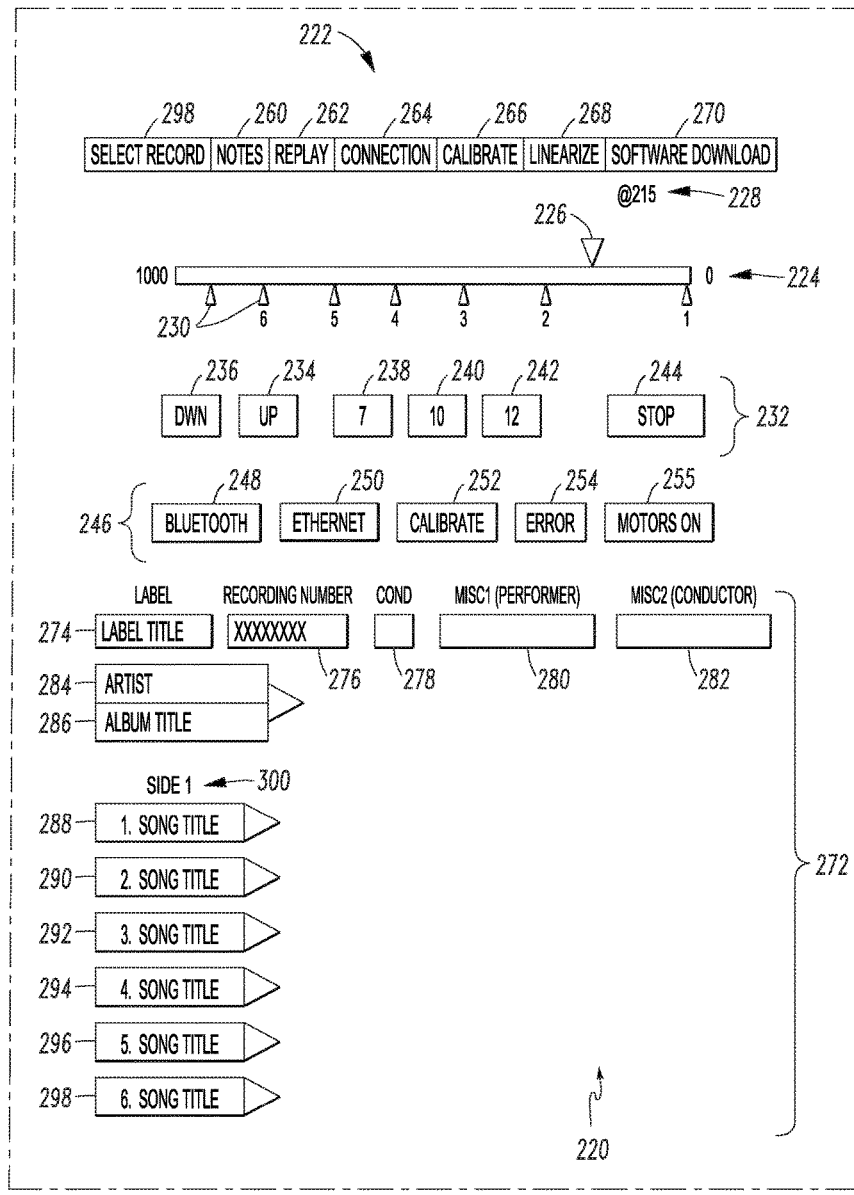
FIG. 11 is a diagram of a control display screen for controlling the manual to automatic record player conversion device of FIG. 1.
Figure 12:
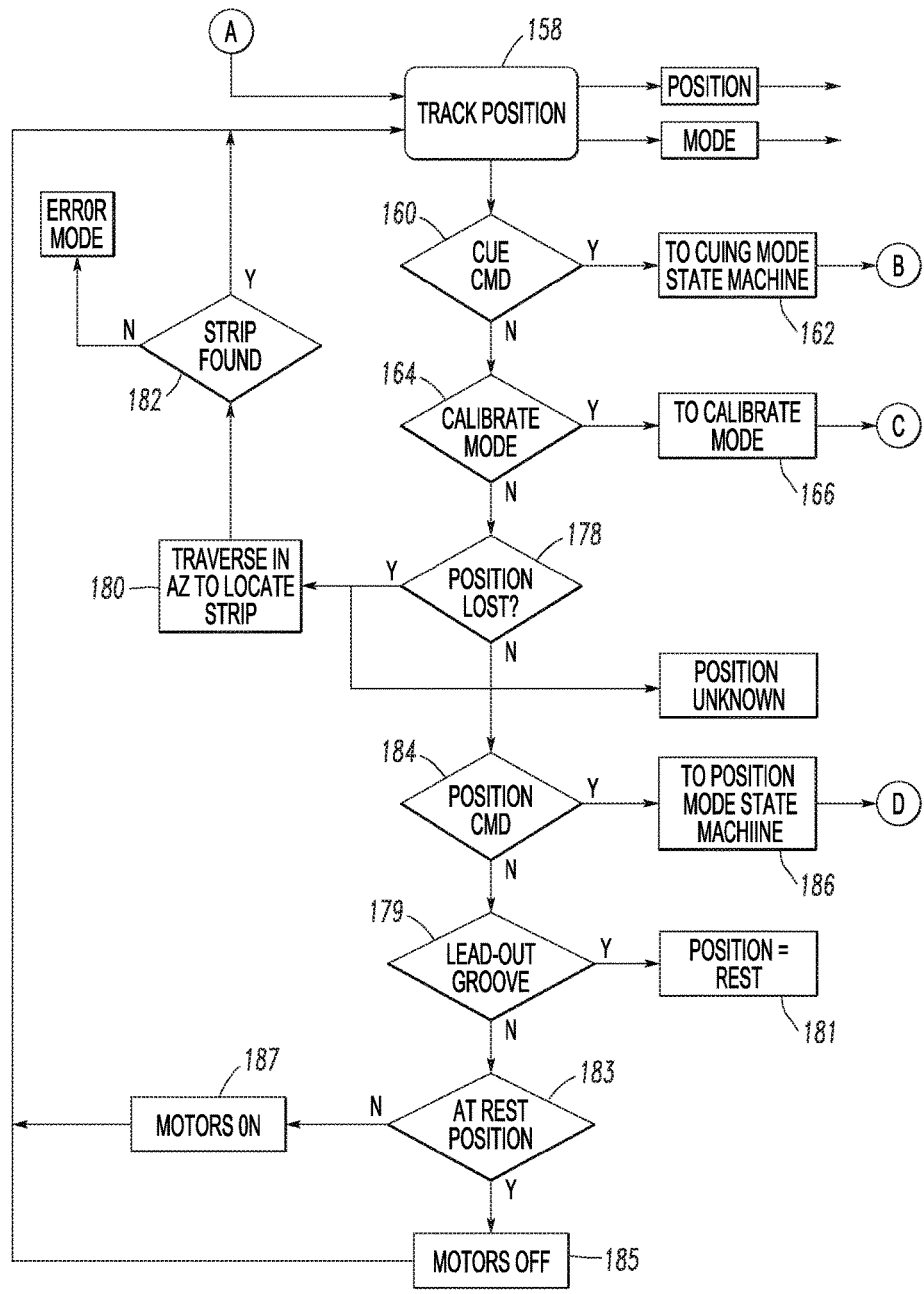
FIG. 12 is a flowchart showing a tracking operation for the manual to automatic record player conversion device of FIG. 1.

Referring to FIG. 11, an example of a control screen 220 that can be displayed on the screen of a personal computer, a tablet computer, or a smart phone is illustrated. Depending upon the computer or smart phone with which the software for the device 10 is used, items displayed on the control screen 220 could be selected using a touch screen, a mouse, or any other conventional user interface. The specific items displayed on a control screen 220 may also vary by type of computer. For example, the items displayed on the illustrated example of the control screen 220 may be broken into several screens for use with a smaller smart phone screen. The illustrated example of the control screen 220 includes a menu bar 222, which in the illustrated example is displayed across the top of the control screen 220. A tone arm position bar 224 is displayed in the illustrated example below the menu bar 222. In the illustrated example, the tonearm position bar 224 includes a tone arm position stylist 226 as well as a digital tonearm position indicator 228. The tonearm position stylist 226 and position indicator 228 in the illustrated example display a tonearm position which is denoted between the rest position of zero and the lead out groove position of 1000. If the tonearm 18 is elevated, the tonearm position stylist 226 will also be displayed elevated from the tonearm position bar 224. The illustrated example of the tonearm position bar 224 also includes song beginning indicators 230 displayed below the tonearm indicator bar 224.

The illustrated example of the control screen 220 includes manual control buttons 232, which in the illustrated example are disposed below the tonearm position indicator bar 224. In the illustrated example, the manual control buttons include up and down buttons 234, 236, respectively, for raising and lowering the tonearm 18. Buttons 238, 240, 242 are each used to initiate playing a 7 inch, 10 inch, or 12 inch record, respectively. The stop button 244 may be used to stop play and return the tonearm 18 to its rest position.

The illustrated example of the control screen 220 includes various status indicators 246. In the illustrated example, the status indicators include a Bluetooth indicator 248 for indicating a Bluetooth connection to the device 10, and ethernet indicator 250 indicating an ethernet connection to the device 10, a calibrate indicator 252 indicating when calibration is taking place, in error indicator 254 indicating when an error has occurred, and a motors on indicator 255 indicating that the motors are ready to move the tonearm 18 and that the turntable power is on.

In the illustrated example, the menu bar 222 includes a select record icon 258 a notes icon 260 a replay icon 262, a connection icon 264, a calibrate icon 266, a linear rise icon 268, and a software download icon 270. In the illustrated example, the select record icon 258 is used to access submenus to select record entries in the local database, to change data within a selection with a local database, to delete a record within the local database, or to enter data for a new record that is not yet within the local database. An example of data 272 for a record is illustrated in a lower portion of the control screen 220. In the illustrated example, the data includes a label 274, a recording number 276 a condition field 278 and a pair of miscellaneous fields 280, 282. In the illustrated example, the condition is displayed as a numerical value which in the illustrated example is between one and five. The artist 284 and album title 286 are also displayed. Lastly, the songs 288, 290, 292, 294, 296, and 298 for the selected album side 300 are displayed. This information can be newly added, edited, or deleted using appropriate menu icons.

To enter information for a new record, a "new album" selection may be chosen from the select record submenu. After completing the information in the various data fields, the record is played. As the tonearm 18 encounters the grooves separating the individual songs, the increased movement of the tonearm is detected as described above, with the location of the start of each song being recorded as it is encountered by the tonearm 18. The process can then be repeated for the other side of the record. When complete information is entered for a given record, that information can be uploaded into an Internet database that is accessible to other users of other devices 10.

When playing a record for which all data has already been recorded, is no longer necessary to play the record from start to finish, or to manually move the tonearm 18 to the start of desired songs. In the illustrated example, the replay icon 262 is utilized to bring up the submenu permitting the user to enter a desired sequence of songs, and then to play the desired song sequence. As one example, selecting a song may open a dialog box permitting the user to enter the number in the sequence in which that songs to be played, as well as the number of times the side or song is to be repeated.

The connection icon 264 can be utilized to connect to the device 10. The installed app on a computer, tablet, or smart phone can make connection to the unit over Bluetooth or IP (ethernet, or Wi-Fi).

The calibrate menu icon 266 is used to calibrate the device 10 as described above.

Figure 18:
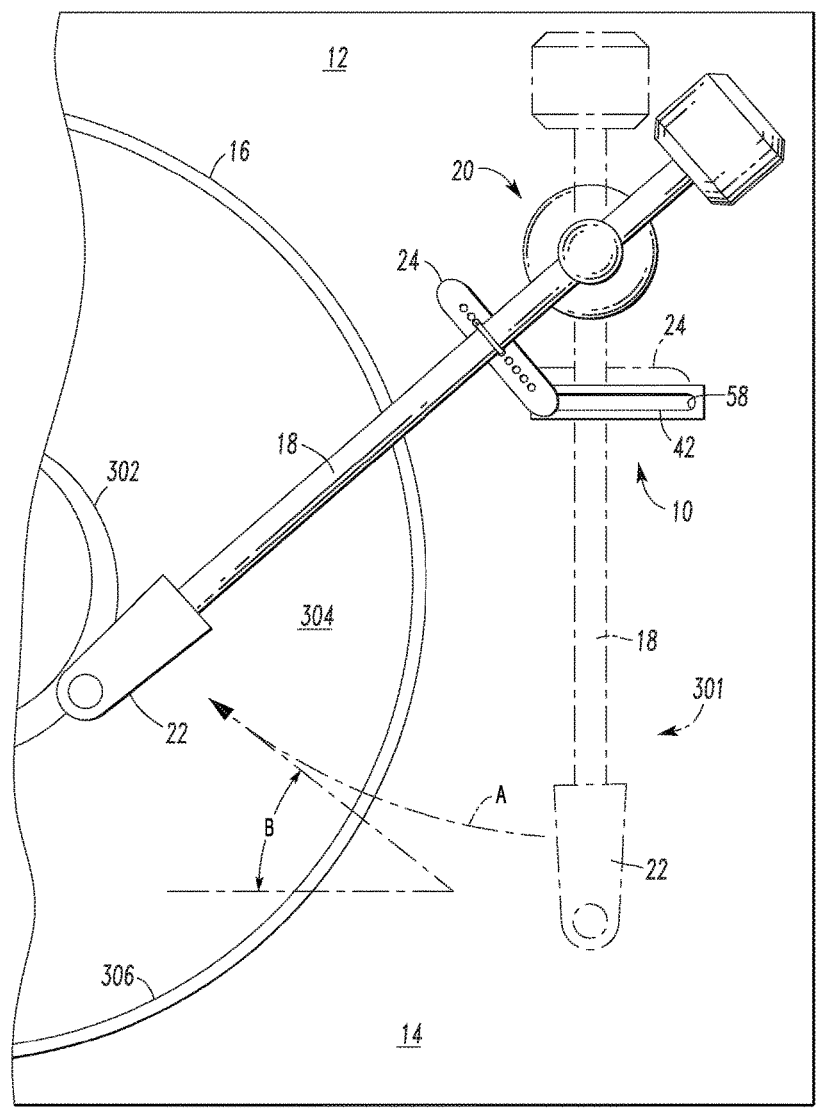
FIG. 18 is a top plan view of a manual record player having a manual to automatic record player conversion device, showing a first mounting orientation, and illustrating the changing angle of movement of the tonearm with respect to the conversion device.

The linearize menu icon 268 is used following calibration, in order to compensate for different possible positioning of the base unit 42 of the device 10 on the turntable housing 14. Although the piston 72 moves linearly in a horizontal direction, the tonearm 18 that is ultimately moved by the piston 72 moves in an arc, as illustrated by the arrow A. Thus, in the example of standard mounting shown in FIG. 18, when the tonearm 18 is in its at rest position 301, the piston 72 is moving the tonearm 18 in a direction that is substantially parallel to the movement of the piston 72. However, when the tonearm 18 reaches the lead out groove 302 of the record 304, the movement of the tonearm 18 is now angled with respect to the direction in which the piston 72 moves horizontally. The angle between the direction of piston 72 movement and tonearm 18 movement is illustrated by angle B. In order to move the tonearm 18 a given distance, the piston 72 will have to move a distance equal to the desired distance of tonearm 18 movement divided by the cosine of angle B. Expressed differently, for any position of the tonearm 18, the distance that the tonearm 18 will move when the piston 72 moves a given distance is equal to the distance traveled by the piston 72, multiplied by the cosine of the angle between the direction of piston 72 movements and the direction of tonearm 18 movement. Therefore, as the tonearm 18 is moved from the rest position 301 towards the lead out groove 302, the movement of the tonearm 18 will gradually decrease with respect to the movement of the piston 72.

Figure 19:
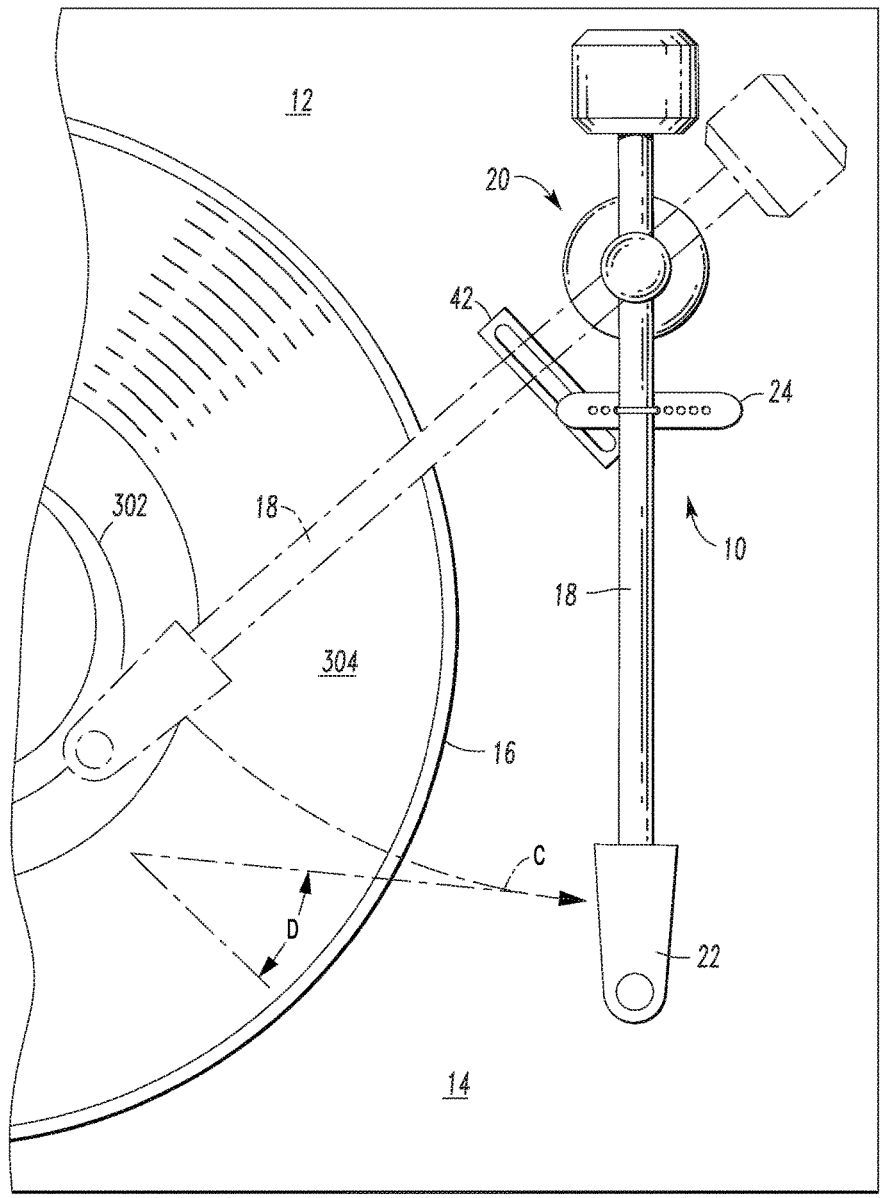
FIG. 19 is a top plan view of a manual record player having a manual to automatic record player conversion device, showing a second mounting orientation, and illustrating the changing angle of movement of the tonearm with respect to the conversion device.

The opposite situation exists in the case of reverse mounting as illustrated in FIG. 19. The tonearm is moving in the arc shown by the arrow C. When the tonearm 18 is at the lead out groove 302, the piston 72 is moving the tonearm 18 in a direction that is substantially parallel to the movement of the piston 72. However, when the tonearm 18 reaches its rest position 301, the movement of the tonearm 18 is now angled with respect to the direction in which the piston 72 moves horizontally. The angle between the direction of piston 72 movements and tonearm 18 movement is illustrated by angle D. In order to move the tonearm 18 a given distance, the piston 72 will have to move a distance equal to the desired distance of tonearm 18 movement divided by the cosine of angle D. Expressed differently, for any position of the tonearm 18, the distance that the tonearm 18 will move when the piston 72 moves a given distance is equal to the distance traveled by the piston 72, multiplied by the cosine of the angle between the direction of piston 72 movement and the direction of tonearm 18 movement. Therefore, as the tonearm 18 is moved from the lead out groove 302 towards its rest position 301, the movement of the tonearm 18 will gradually decrease with respect to the movement of the piston 72.

Because the tonearm position is recorded by tracking the position of the motor 66 as it moves the piston 72 horizontally, accurately recording the starting position of each song on a given record in a manner that can be uploaded into the Internet database and/or used with a different device 10, it is necessary to linearize the arced movement of the tonearm 18. While linearizing the movement, it is helpful but not necessary to know whether the base unit 42 is mounted in a standard or reverse configuration. As the tonearm 18 is moved from its rest position 301 to the position of the lead out groove 302 on a record, not only is the movement of the motor 66 recorded, but this movement is multiplied by the cosine of the angle between the direction of piston 72 movement and the direction of tonearm 18 movement at each point for which movement is recorded. With this information known, the quantity with which to multiply each position on a record at which a beginning of the song is recorded in order to record that position in terms of a tonearm 18 position rather than a motor 66 position is known. Additionally, the quantity by which to divide each tonearm 18 position in the database in order to convert that tonearm 18 movement into a motor 66 movement is also known. Linearization therefore permits the data of a record to be recorded using one of either a standard or reverse mounted base unit 42, and then utilizing the data with either of a standard or reverse mounted housing 42. Some examples of Internet database is utilized with the device 10 may only permit uploading data to the database if the device 10 from which data is uploaded has first been linearized.

In addition to the differences between standard and reverse mounting, it is unlikely that most users would mount the base unit 42 exactly perpendicular to the tonearm 18 at a beginning or ending point of the movement of the tonearm 18. Some deviation from perpendicular must be anticipated. Once the calibration procedure has been completed, the position of the tonearm 18 corresponding to various locations along the path of the tonearm 18 have been determined by that procedure. With these positions known (rest position 301, lead-in groove 306, lead out groove 302), the relative time required to reach each position, and/or the travel distance of the piston 72 between each position can be compared to the typical tone arm 18 travel distance between each pair of positions. A longer travel of the piston 72 between a pair of positions means that the angle between piston 72 movement and tonearm 18 movement is greater. A shorter travel of the piston 72 between a pair of positions means that the angle between piston 72 movement and tonearm 18 movement is smaller. Knowing that the arc of the tonearm 18 movement will be a portion of a circle, a curve representing the movement of the tonearm 18 can be generated based on the data derived from linearization process. This curve can be represented as a mathematical function relating horizontal movement of the piston 72 to the arced movement of the tonearm 18. Once this curve is known, then the direction of travel of the tonearm 18 at any point along this curve is known. In addition to the mathematical function describing the curve, with this information, the cosine of the angle between the drive screw 62 and the direction of travel of the tonearm 18 can be calculated at any point along the curve. When the app records the starting points of each song on a record, this information can then be used as described above to linearize those starting points. When linearized data is downloaded from the Internet through the app to the device 10, the information can be similarly converted for use on a specific device 10 and record player 12.

The last menu icon in the illustrated example of the menu bar 222 is the software download icon 270. In the illustrated example, this icon causes a software installation submenu to be displayed, permitting the user to download, update, and install the software necessary to operate the device 10.

The device 10 therefore provides a means for converting a manual record player into an automatic record player. Because the only portion of the device 10 that is attached to the tonearm 18 is the lightweight blade 24, the sensitivity of the tonearm 18 is substantially unaffected by the use of the device 10. Thus, the functionality of an automatic record player can be combined with the sensitivity of a manual record player. The device 10 can be installed on a record player without permanent modification of the record player. Some examples of the device 10 provide a means for creating data about the starting point of songs on an individual record. In some examples, this data can be used exclusively locally. In other examples, the static can be converted into a form that can be uploaded into an Internet database, and shared with other users of other devices 10.

Although the description above is based on a conversion device for converting a manual record player to an automatic record player, a record player may be originally supplied in automatic form, with a portion of the record player controlling tonearm movement essentially as described above, without departing from the scope of the invention. For the purpose of the specification and claims herein, an automatic record player includes either a record player that is originally supplied in automatic form, or a manual record player that is converted to automatic form by a conversion device as described herein.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A conversion device for converting a manual record player to an automatic record player, the manual record player having a housing, a turntable, and a tonearm, the tonearm being structured for movement between a rest position and a record ending position adjacent to a central portion of the turntable, the tonearm defining a range of tonearm motion between the rest position and the record ending position, the conversion device comprising:
a base unit that is structured to be secured to the housing of the manual record player below a portion of the range of motion of the tonearm, the base unit comprising:
a piston assembly, comprising:
a piston, the piston being movable between a lower position and an upper position, the piston being structured to engage a piston-engaging tonearm element, and to elevate the tonearm, when the piston is in its upper position, the piston being further structured to disengage the piston-engaging tonearm element when in the lower position;
a first motor assembly, the first motor assembly being structured to move the piston between its lower position and its upper position;
a drive assembly having a second motor assembly, the second motor assembly being operatively connected to the piston assembly, the drive assembly being structured to move the piston assembly between a first position and a second position, the first position corresponding to the rest position of the tonearm, the second position corresponding to the record ending position of the tonearm; and
a control system, the control system being structured to selectively raise and lower the piston, and to selectively move the piston assembly towards the first position and the second position;
whereby the tonearm may be moved to a preselected position by moving the piston assembly under the piston-engaging tonearm element, raising the piston, moving the piston generally horizontally until the tonearm is in a preselected position, and lowering the piston.

2. The conversion device according to claim 1, wherein the piston-engaging tonearm element is a blade, the blade being structured to be secured to the tonearm.

3. The conversion device according to claim 2, further comprising a location system for locating the piston assembly with respect to the blade.

4. The conversion device according to claim 3, wherein the location system comprises:
a light source and a light sensor disposed on the piston assembly, the light source being structured to direct light upward from the base unit, the light sensor being structured to receive light directed downward towards the piston assembly; and
a reflective portion of the blade, the reflective portion being structured to reflect light from the light source towards the light sensor when the piston assembly is in a location wherein the piston can be raised to engage the blade and raise the tonearm.

5. The conversion device according to claim 1, further comprising:
a first location tracking system for tracking a location of the piston with respect to the piston assembly; and
a second location tracking system for tracking a location of the piston assembly with respect to the base unit.

6. The conversion device according to claim 5, wherein the first location tracking system includes a stepper motor having a calibrated stepper motor drive system.

7. The conversion device according to claim 6, wherein the first location tracking system includes a position sensor that is structured to provide a signal upon the piston reaching a predetermined position with respect to the piston assembly.

8. The conversion device according to claim 5, wherein the second location tracking system includes a stepper motor having a calibrated stepper motor drive system.

9. The conversion device according to claim 8, wherein the second location tracking system includes a position sensor that is structured to provide a signal upon the piston assembly reaching a predetermined position with respect to the base unit.

10. The conversion device according to claim 1, wherein the control system further comprises:
a central processing unit operatively connected to the motor-driven piston assembly, the central processing unit being structured to cause the motor-driven piston assembly to move the tonearm to a preselected location;
a tracking system that is structured to track a location of the motor-driven piston assembly and the tonearm, the tracking system being operatively connected to the central processing unit; and
a local database structured to store a plurality of positions of starting locations of songs on a record, the database being operatively connected to the central processing unit;
whereby the central processing unit controls the motor-driven piston assembly to move the tonearm to a location that is stored within the local database.

11. The conversion device of claim 10, wherein the central processing unit is structured to record locations of song starting points on a record in the local database based on a distance of movement of the tonearm or movement of the motor-driven piston assembly from a predetermined position to each song starting point.

12. The conversion device of claim 11, wherein storage of a song starting point in the local database occurs upon receiving user input denoting that the tonearm is in a location of a song starting point.

13. The conversion device of claim 11, wherein the storage of a song starting point in the local database occurs upon tracking a movement of the tonearm which is sufficiently larger than a movement of the tonearm within a groove of a record in which a song is recorded to indicate that the tonearm is located in a groove defined on the record between songs.

14. The conversion device of claim 10, further comprising a communication apparatus for transferring information about song starting points on records between the local database and a shared database.

15. The conversion device of claim 14, further comprising a conversion system for converting a tonearm position corresponding to a starting point for a song into a standardized tonearm position, the standardized tonearm position being usable on another automatic record player.

16. The conversion device of claim 15, wherein the conversion system is structured to:
determine reference points within an arc of travel of the tonearm corresponding to points of known position on a record;
determine a distance of movement of the tonearm with respect to a movement of the motor-driven piston assembly of a known distance between the reference points;
determine a curve identifying the arc of travel of the tonearm by identifying correspondence between the reference points and the distance of movement with respect to the movement of the motor-driven piston assembly of a known distance between the reference points;
determine a mathematical function describing the curve; and
utilize the mathematical function to convert song start positions based on the distance of movement of the motor-driven piston assembly to song start positions based on the distance of movement of the tonearm.

17. An automatic record player, comprising:
a record player housing;
a turntable rotatably secured to the record player housing;
a tonearm, the tonearm being structured for movement between a rest position and a record ending position adjacent to a central portion of the turntable, the tonearm defining a range of tonearm motion between the rest position and the record ending position;
a base unit disposed on the record player housing below a portion of the range of motion of the tonearm, the base unit comprising:
a piston assembly, comprising:
a piston, the piston being movable between a lower position and an upper position, the piston being structured to engage a piston-engaging tonearm element, and to elevate the tonearm, when the piston is in its upper position, the piston being further structured to disengage the piston-engaging tonearm element when in the lower position;
a first motor assembly, the first motor assembly being structured to move the piston between its lower position and its upper position;
a drive assembly having a second motor assembly, the second motor assembly being operatively connected to the piston assembly, the drive assembly being structured to move the piston assembly between a first position and a second position, the first position corresponding to the rest position of the tonearm, the second position corresponding to the record ending position of the tonearm; and
a control system, the control system being structured to selectively raise and lower the piston, and to selectively move the piston assembly towards the first position and the second position;
whereby the tonearm may be moved to a preselected position by moving the piston assembly under the piston-engaging tonearm element, raising the piston, moving the piston generally horizontally until the tonearm is in a preselected position, and lowering the piston.

18. The automatic record player according to claim 17, wherein the piston-engaging tonearm element is a blade, the blade being structured to be secured to the tonearm.

19. The automatic record player according to claim 18, further comprising a location system for locating the piston assembly with respect to the blade.

20. The automatic record player according to claim 19, wherein the location system comprises:
a light source and a light sensor disposed on the piston assembly, the light source being structured to direct light upward from the base unit, the light sensor being structured to receive light directed downward towards the piston assembly; and
a reflective portion of the blade, the reflective portion being structured to reflect light from the light source towards the light sensor when the piston assembly is in a location wherein the piston can be raised to engage the blade and raise the tonearm.

21. The automatic record player according to claim 17, further comprising:
a first location tracking system for tracking a location of the piston with respect to the piston assembly; and a second location tracking system for tracking a location of the piston assembly with respect to the base unit.

22. The automatic record player according to claim 21, wherein the first location tracking system includes a stepper motor having a calibrated stepper motor drive system.

23. The automatic record player according to claim 22, wherein the first location tracking system includes a position sensor that is structured to provide a signal upon the piston reaching a predetermined position with respect to the piston assembly.

24. The automatic record player according to claim 21, wherein the second location tracking system includes a stepper motor having a calibrated stepper motor drive system.

25. The automatic record player according to claim 24, wherein the second location tracking system includes a position sensor that is structured to provide a signal upon the piston assembly reaching a predetermined position with respect to the base unit.

* * * * *